United States Patent
Laddu

(10) Patent No.: US 12,212,397 B2
(45) Date of Patent: Jan. 28, 2025

(54) UE PANEL COMBINATION-SPECIFIC CORESET CONFIGURATION FOR CELL-FREE MASSIVE MIMO

(71) Applicant: Nokia Technologies Oy, Espoo (FI)

(72) Inventor: Keeth Saliya Jayasinghe Laddu, Espoo (FI)

(73) Assignee: Nokia Technologies Oy, Espoo (FI)

( * ) Notice: Subject to any disclaimer, the term of this patent is extended or adjusted under 35 U.S.C. 154(b) by 379 days.

(21) Appl. No.: 17/765,245

(22) PCT Filed: Sep. 21, 2020

(86) PCT No.: PCT/FI2020/050604
§ 371 (c)(1),
(2) Date: Mar. 30, 2022

(87) PCT Pub. No.: WO2021/074485
PCT Pub. Date: Apr. 22, 2021

(65) Prior Publication Data
US 2022/0393752 A1    Dec. 8, 2022

Related U.S. Application Data

(60) Provisional application No. 62/914,679, filed on Oct. 14, 2019.

(51) Int. Cl.
*H04B 7/08* (2006.01)
*H04B 7/024* (2017.01)
(Continued)

(52) U.S. Cl.
CPC .......... *H04B 7/0857* (2013.01); *H04B 7/024* (2013.01); *H04B 7/0404* (2013.01);
(Continued)

(58) Field of Classification Search
CPC .... H04B 7/0857; H04B 7/024; H04B 7/0404; H04B 7/0632; H04B 7/06956;
(Continued)

(56) References Cited

U.S. PATENT DOCUMENTS

| 2018/0227094 A1 | 8/2018 | Liu et al. |
| 2019/0053270 A1 | 2/2019 | Akoum et al. |

(Continued)

FOREIGN PATENT DOCUMENTS

| WO | 2018/204282 A1 | 11/2018 |
| WO | 2018/204340 | 11/2018 |
| WO | 2019/031850 | 2/2019 |

OTHER PUBLICATIONS

"Beam Related Indication for Beam Management", 3GPP TSG RAN WG1 Meeting #88, R1-1701799, Agenda : 8.1.2.2.1, ZTE, Feb. 13-17, 2017, 5 pages.

(Continued)

*Primary Examiner* — Steven Hieu D Nguyen
(74) *Attorney, Agent, or Firm* — Barta Jones, PLLC

(57) ABSTRACT

A method of operating a radio network element includes receiving user equipment (UE) capability information indicating panel combinations of a multi panel UE (MP-UE), each including at least one antenna panel from among a plurality of antenna panels of the MP-UE; receiving signal strength information corresponding to plurality of transmission reception points (TRPs); based on the signal strength information, determining a plurality of TRP sets corresponding to the plurality of panel combinations, respectively; and generating a plurality of control resource set (CORESET) configurations corresponding to the plurality of panel combinations, respectively, wherein, for each panel combination, the TRP set corresponding to the panel combination indicates at least one TRP from among the plurality of TRPs, and the CORESET configuration corresponding to the panel (Continued)

combination defines one or more CORESETs to be used by the at least one TRP to provide downlink (DL) transmissions to the MP-UE via the panel combination.

18 Claims, 6 Drawing Sheets

(51) Int. Cl.
  *H04B 7/0404* (2017.01)
  *H04B 7/06* (2006.01)
  *H04W 72/23* (2023.01)
  *H04W 36/00* (2009.01)
(52) U.S. Cl.
  CPC .......... *H04B 7/0632* (2013.01); *H04W 72/23* (2023.01); *H04W 36/00692* (2023.05)
(58) Field of Classification Search
  CPC ............ H04W 72/23; H04W 36/00692; H04L 5/0053; H01Q 1/241; H01Q 21/205; H01Q 25/00; H01Q 21/061
  See application file for complete search history.

(56) References Cited

U.S. PATENT DOCUMENTS

| 2019/0081750 | A1 | 3/2019 | Yang et al. | |
|---|---|---|---|---|
| 2019/0306881 | A1 | 10/2019 | Fakoorian et al. | |
| 2020/0067615 | A1* | 2/2020 | Ghanbarinejad | H04B 17/309 |
| 2020/0106168 | A1* | 4/2020 | Hakola | H04B 7/0617 |
| 2020/0207240 | A1* | 7/2020 | Subramanian | B60N 2/163 |
| 2021/0167821 | A1* | 6/2021 | Chen | H04B 7/0408 |
| 2021/0281294 | A1* | 9/2021 | Takano | H04W 16/28 |
| 2023/0080333 | A1* | 3/2023 | Li | H04B 7/0404 375/267 |

OTHER PUBLICATIONS

"UE Reporting for Beam Management", 3GPP TSG RAN WG1 Meeting #88, R1-1701800, Agenda : 8.1.2.2.1, ZTE, Feb. 13-17, 2017, 6 pages.
"On Group-based Reporting of Tx Beams", 3GPP TSG-RAN WG1 #88, R1-1702675, Agenda : 8.1.2.2.1, Ericsson, Feb. 13-17, 2017, pp. 1-5.
"On Beam Grouping Reporting in NR", 3GPP TSG-RAN WG1#88, R1-1703160, Agenda : 8.1.2.2.1, Nokia, Feb. 13-17, 2017, 7 pages.
"Enhancements on Multi-TRP/panel Transmission", 3GPP TSG RAN WG1 Meeting #96, R1-1901567, Agenda : 7.2.8.2, Huawei, Feb. 25-Mar. 1, 2019, 14 pages.
"Evaluation and Analysis on Simultaneous Multi-panel Tx", 3GPP TSG RAN WG1 Meeting #96bis, R1-1904212, Agenda : 7.2.8.6, LG Electronics, Apr. 8-12, 2019, pp. 1-7.
"Feature Lead Summary of Enhancements on Multi-beam Operations", 3GPP TSG RAN WG1 Meeting #98, R1-1909486, Agenda : 7.2.8.3, LG Electronics, Aug. 26-30, 2019, pp. 1-35.
"Discussion on CORESET Configuration", 3GPP TSG RAN WG1 Meeting #90, R1-1713166, Agenda : 6.1.3.1.2.1, LG Electronics, Aug. 21-25, 2017, pp. 1-7.
Interdonato et al., "Ubiquitous Cell-free Massive MIMO Communications", arXiv, Sep. 6, 2019, pp. 1-13.
"3rd Generation Partnership Project; Technical Specification Group Radio Access Network; NR; Radio Resource Control (RRC) protocol specification (Release 15)", 3GPP TS 38.331, V15.7.0, Sep. 2019, pp. 1-527.
International Search Report and Written Opinion received for corresponding Patent Cooperation Treaty Application No. PCT/FI2020/050604, dated Dec. 9, 2020, 16 pages.
"Enhancements to Multi-Beam Operation", 3GPP TSG-RAN WG1 Meeting #96bis, Tdoc R1-1905156, Agenda : 7.2.8.3, Ericsson, Apr. 8-12, 2019, pp. 1-16.
"Discussion of Multi-TRP/panel Transmission", 3GPP TSG RAN WG1 #96bis, R1-1904572, Agenda : 7.2.8.2, Lenovo, Apr. 8-12, 2019, 11 pages.
Extended European Search Report received for corresponding European Patent Application No. 20875981.1, dated Oct. 11, 2023, 4 pages.
"Considerations on Multi-TRP/Panel Transmission", 3GPP TSG RAN WG1 Meeting #AH1901, R1-1900377, Agenda : 7.2.8.2, Sony, Jan. 21-25, 2019, 3 pages.
"CSI measurement and reporting for coordinated transmission scheme", 3GPP TSG RAN WG1 Meeting #87, R1-1611674, Agenda : 7.1.3.3, Huawei, Nov. 14-18, 2016, pp. 1-5.
Notice of Allowance received for corresponding European Patent Application No. 20875981.1, dated Aug. 16, 2024, 7 pages.

* cited by examiner

CORESET Configuration 610

| TRP Set 615 | Assigned CORESETs |
|---|---|
| First TRP 120A | #1, #2 |
| Second TRP 120B | #4 |
| Fourth TRP 120D | #3, #5 |

CORESET Configuration 620

| TRP Set 615 | Assigned CORESETs |
|---|---|
| Third TRP 120C | #4 |
| Fourth TRP 120D | #1, #3 |
| Fifth TRP 120E | #2, #5 |

FIG. 6

UE PANEL COMBINATION-SPECIFIC CORESET CONFIGURATION FOR CELL-FREE MASSIVE MIMO

RELATED APPLICATION

This application was originally filed as PCT Application No. PCT/FI2020/050604, filed on Sep. 21, 2020, which claims priority from U.S. Provisional Application No. 62/914,679, filed on Oct. 14, 2019, each of which is incorporated herein by reference in its entirety.

TECHNICAL FIELD

One or more example embodiments relate to Third Generation Partnership Project (3GPP) New Radio (NR) systems.

BACKGROUND

Fifth generation (5G) wireless communications networks are the next generation of mobile communications networks. Standards for 5G communications networks are currently being developed by the Third Generation Partnership Project (3GPP). These standards are known as 3GPP New Radio (NR) standards.

SUMMARY

The scope of protection sought for various example embodiments of the invention is set out by the independent claims. The example embodiments and features, if any, described in this specification that do not fall under the scope of the independent claims are to be interpreted as examples useful for understanding various example embodiments of the invention.

According to at least some example embodiments, a method of operating a radio network element includes receiving user equipment (UE) capability information indicating a plurality of panel combinations of a multi panel UE (MP-UE), each panel combination including at least one antenna panel from among a plurality of antenna panels of the MP-UE; receiving, from the MP-UE, signal strength information corresponding to a plurality of transmission reception points (TRPs); based on the signal strength information, determining a plurality of TRP sets that correspond to the plurality of panel combinations, respectively; and generating a plurality of control resource set (CORESET) configurations that correspond to the plurality of panel combinations, respectively, wherein, for each panel combination, the TRP set corresponding to the panel combination indicates at least one TRP from among the plurality of TRPs, and the CORESET configuration corresponding to the panel combination defines one or more CORESETs to be used by the at least one TRP to provide downlink (DL) transmissions to the MP-UE via the panel combination.

Each panel combination from among the plurality of panel combinations that includes at least two antenna panels may be a panel combination that the MP-UE is capable of activating in such a manner that the MP-UE receives DL transmissions through the activated panels included in the panel combination, simultaneously.

The radio network element may be a first TRP included in the plurality of TRPs.

The method may further include sending, by the first TRP, higher layer configuration information of the MP-UE from the first TRP to one or more second TRPs from among the plurality of TRPs, the higher layer configuration information identifying the panel combinations of the MP-UE and the CORESET configurations corresponding to the panel combinations.

The method may further include receiving, by the first TRP, a first indication from the MP-UE, the first indication identifying an activated panel combination from among the plurality of panel combinations of the MP-UE; in response to receiving the first indication, determining, by the first TRP, whether the first TRP is included in the TRP set from among the plurality of TRP sets that corresponds to the activated panel combination; and in response to determining the first TRP is included in the TRP set that corresponds to the activated panel combination, using the CORESET configuration from among the plurality of CORESET configurations that corresponds to the activated panel combination to provide DL transmissions from the first TRP to the MP-UE.

The signal strength information may include signal strength information corresponding to the plurality of TRPs, with respect to each of one or more panel combinations from among the plurality of panel combinations.

According to at least some example embodiments, a method of operating a first transmission reception point (TRP) in a communications network includes storing a plurality of control resource set (CORESET) configurations corresponding, respectively, to a plurality of panel combinations of a multi panel user equipment (MP-UE), each panel combination including at least one antenna panel from among a plurality of antenna panels of the MP-UE; receiving a first indication from the MP-UE, the first indication identifying a first activated panel combination from among the plurality of panel combinations of the MP-UE; and using the CORESET configuration from among the plurality of CORESET configurations that corresponds to the first activated panel combination to provide downlink (DL) transmissions to the MP-UE.

Each panel combination from among the plurality of panel combinations that includes at least two antenna panels may be a panel combination that the MP-UE is capable of activating in such a manner that the MP-UE receives DL transmissions through the activated panels included in the panel combination, simultaneously.

The method may further include sending the first activated panel combination to one or more second TRPs.

The method may further include receiving a second indication from the MP-UE, the second indication identifying a second activated panel combination from among the plurality of panel combinations of the MP-UE; and using the CORESET configuration from among the plurality of CORESET configurations that corresponds to the second activated panel combination to provide DL transmissions from the first TRP to the MP-UE.

The method may further include sending the second activated panel combination to one or more second TRPs.

According to at least some example embodiments, a method of operating a multi-panel user equipment (MP-UE) includes generating, by the MP-UE, UE capability information indicating a plurality of valid panel combinations of the MP-UE, each valid panel combination identifying a configuration of one or more antenna panels, from among a plurality of antenna panels included in the MP-UE; and sending the UE capability information to a radio network element.

The method may further include determining, by the MP-UE, signal strength information corresponding to a plurality of transmission reception points (TRPs), for each of one or more panel combinations from among the plurality of valid panel combinations; and sending, to the radio network element, a measurement report including the signal strength information determined for the one or more panel combinations.

The method may further include activating, by the MP-UE, a panel combination from among the plurality of valid panel combinations of the MP-UE; and sending an indication of the activated panel combination to the radio network element.

According to at least some example embodiments, a radio network element includes a processor; and memory storing computer-executable instructions that, when executed by the processor, cause the processor to perform operations including, receiving user equipment (UE) capability information indicating a plurality of panel combinations of a multi panel UE (MP-UE), each panel combination including at least one antenna panel from among a plurality of antenna panels of the MP-UE, receiving, from the MP-UE, signal strength information corresponding to plurality of transmission reception points (TRPs), based on the signal strength information, determining a plurality of TRP sets that correspond to the plurality of panel combinations, respectively, and generating a plurality of control resource set (CORESET) configurations that correspond to the plurality of panel combinations, respectively, wherein, for each panel combination, the TRP set corresponding to the panel combination indicates at least one TRP from among the plurality of TRPs, and the CORESET configuration corresponding to the panel combination defines one or more CORESETs to be used by the at least one TRP to provide downlink (DL) transmissions to the MP-UE via the panel combination.

According to at least some example embodiments, a first transmission reception point (TRP) includes a processor; and memory storing computer-executable instructions that, when executed by the processor, causes the processor to perform operations including, storing a plurality of control resource set (CORESET) configurations corresponding, respectively, to a plurality of panel combinations of a multi panel user equipment (MP-UE), each panel combination including at least one antenna panel from among a plurality of antenna panels of the MP-UE, receiving a first indication from the MP-UE, the first indication identifying a first activated panel combination from among the plurality of panel combinations of the MP-UE, and using the CORESET configuration from among the plurality of CORESET configurations that corresponds to the first activated panel combination to provide downlink (DL) transmissions to the MP-UE.

According to at least some example embodiments, a multi-panel user equipment (MP-UE) includes a plurality of antenna panels; a processor; and memory storing computer-executable instructions that, when executed by the processor, cause the processor to perform operations including, generating, by the MP-UE, UE capability information indicating a plurality of valid panel combinations of the MP-UE, each valid panel combination identifying a configuration of one or more antenna panels, from among a plurality of antenna panels included in the MP-UE, and sending the UE capability information to a radio network element.

According to at least some example embodiments, a radio network element includes means for receiving user equipment (UE) capability information indicating a plurality of panel combinations of a multi panel UE (MP-UE), each panel combination including at least one antenna panel from among a plurality of antenna panels of the MP-UE, means for receiving, from the MP-UE, signal strength information corresponding to plurality of transmission reception points (TRPs), means for determining a plurality of TRP sets that correspond to the plurality of panel combinations, respectively, based on the signal strength information, and means for generating a plurality of control resource set (CORESET) configurations that correspond to the plurality of panel combinations, respectively, wherein, for each panel combination, the TRP set corresponding to the panel combination indicates at least one TRP from among the plurality of TRPs, and the CORESET configuration corresponding to the panel combination defines one or more CORESETs to be used by the at least one TRP to provide downlink (DL) transmissions to the MP-UE via the panel combination.

According to at least some example embodiments, a first transmission reception point (TRP) includes means for storing a plurality of control resource set (CORESET) configurations corresponding, respectively, to a plurality of panel combinations of a multi panel user equipment (MP-UE), each panel combination including at least one antenna panel from among a plurality of antenna panels of the MP-UE, means for receiving a first indication from the MP-UE, the first indication identifying a first activated panel combination from among the plurality of panel combinations of the MP-UE, and means for using the CORESET configuration from among the plurality of CORESET configurations that corresponds to the first activated panel combination to provide downlink (DL) transmissions to the MP-UE.

According to at least some example embodiments, a multi-panel user equipment (MP-UE) includes means for generating, by the MP-UE, UE capability information indicating a plurality of valid panel combinations of the MP-UE, each valid panel combination identifying a configuration of one or more antenna panels from among a plurality of antenna panels included in the multi-panel UE; and means for sending the UE capability information to a radio network element.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of this disclosure.

FIG. 6 illustrates example CORESET configurations according to example embodiments.

DETAILED DESCRIPTION

Figure 1:
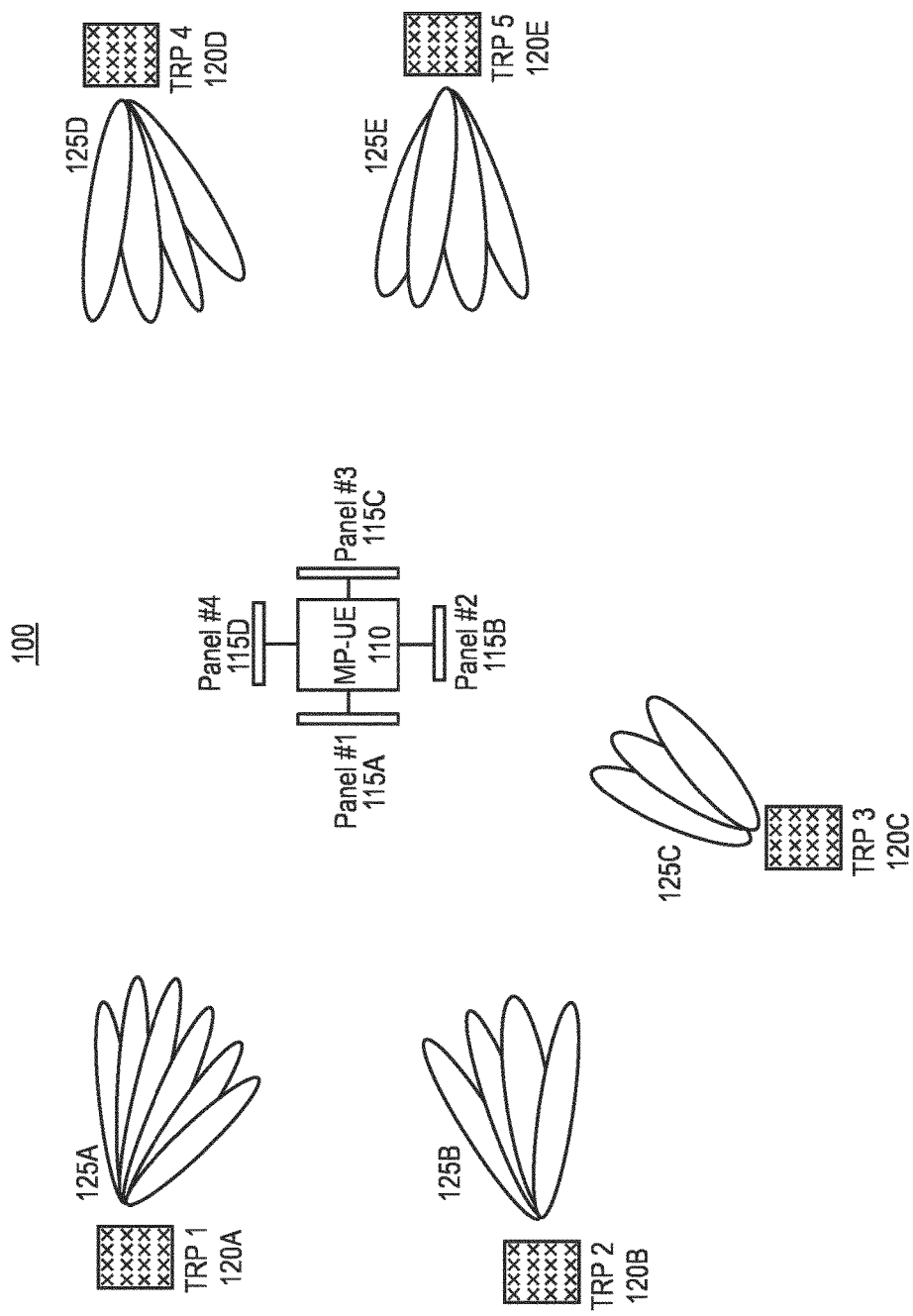
FIG. 1 is a diagram illustrating a portion of a communications network according to example embodiments.

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. The example embodiments may, however, be embodied in many alternate forms and should not be construed as limited to only the embodiments set forth herein.

It should be understood that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

While one or more example embodiments may be described from the perspective of a radio network element or radio access network (RAN) element (e.g., a base station, eNB, next generation Node B (gNB), Central Unit (CU), ng-eNB, etc.), user equipment (UE), or the like, it should be understood that one or more example embodiments discussed herein may be performed by the one or more processors (or processing circuitry) at the applicable device or network element. For example, according to one or more example embodiments, at least one memory may include or store computer program code, and the at least one memory and the computer program code may be configured to, with at least one processor, cause a network node to perform the operations discussed herein. As discussed herein, UE and User may be used interchangeably.

It will be appreciated that a number of example embodiments may be used in combination.

At least some example embodiments facilitate the implementation of cell-free massive multiple input multiple output (MIMO) in a communications network by, for example, reducing a total number of control resource sets (CORESETs) that a multi-panel user equipment (MP-UE) needs to handle during a multi-transmission(Tx)/reception(Rx) point (TRP) transmission operation. Cell-free massive MIMO will now be discussed in greater detail below.

Cell-Free Massive MIMO

One significant aspect of cell-free massive MIMO is simultaneous data transmission to a given UE via multiple TRPs. The simultaneous data transmission can be performed in a coherent or non-coherent manner. Cell-free massive MIMO can be more suitable to 5G New Radio (NR) Frequency Range 2 (FR2), where the number of candidate-TRPs that can be used to transmit towards a UE can be relatively large. In NR, FR2 operation is based on a beamformed air interface. The ability to beamform radio signals enables concentration of the radiated energy on intended targets and increases receiver sensitivity to desired signals. This beamforming ability is achieved, for example, by increasing the number of antennas at the gNB and UE.

In 3GPP Rel-16, the multi-TRP transmission objective is a MIMO work item that may address simultaneous transmission on a small scale. With respect to multi-TRP, non-coherent joint transmission (NC-JT) has also been considered, and transmission of the different layers or different codewords with several design principals on the downlink control channel, including, for example, single physical downlink control channel (PDCCH) design and multiple PDCCH design, have been assumed to support the multi-TRP operation. Considering non-ideal backhaul between TRPs, a Multi-PDCCH based multi-TRP scheme may need to be considered as a baseline for the future development of cell-free massive MIMO. With respect to multi-PDCCH based multi-TRP transmission, 3rd Generation Partnership Project (3GPP) technical specification group (TSG) radio access network (RAN) working group 1 (WG1) (i.e., "RAN1") has made the following agreements.

Agreement—To support multiple-PDCCH based multi-TRP/panel transmission with intra-cell (same cell ID) and inter-cell (different Cell IDs), the following radio resource control (RRC) configuration can be used to link multiple PDCCH/physical downlink shared channel (PDSCH) pairs with multiple TRPs:

One control resource set (CORESET) in a "PDCCH-config" information element (IE) corresponds to one TRP.

Agreement—For PDCCH monitoring and blind decoding for multi-downlink control information (DCI) based multi-TRP/panel transmission:

Increase the maximal number of CORESETs per "PDCCH-config" up to N=[4, 5, or 6] subject to UE capability Increase the maximal number of BD/CCE per slot per serving cell, subject to UE capability.

Agreement—For multi-PDCCH based multi-TRP operation, the maximum number of CORESETs that can be configured with the same TRP (i.e. same higher layer index configured per CORESET (if configured) per "PDCCH-Config") is up to UE capability, including at least a candidate value of 3.

Based on these agreements, the RRC IE PDCCH-Config is used to configure UE specific PDCCH parameters such as control resource sets (CORESET), search spaces and additional parameters for acquiring the PDCCH. Within PDCCH-config, there can be up to five ControlResourceSet IEs, and based on 3GPP Release 16 (Rel-16) agreements there can be an additional higher layer parameter per ControlResourceSet IE.

The ControlResourceSet IE in 3GPP Release 15 (Rel-15) (e.g., 3GPP TS 38.331 v15.7.0) is structured as follows:

ControlResourceSet IE

```
-- ASN1START
-- TAG-CONTROLRESOURCESET-START
ControlResourceSet ::=              SEQUENCE {
    controlResourceSetId            ControlResourceSetId,
    frequencyDomainResources        BIT STRING (SIZE (45)),
    duration                        INTEGER (1..maxCoReSetDuration),
    cce-REG-MappingType             CHOICE {
        interleaved                 SEQUENCE {
            reg-BundleSize              ENUMERATED {n2, n3, n6},
            interleaverSize             ENUMERATED {n2, n3, n6},
            shiftIndex
```

-continued

| ControlResourceSet IE |
| --- |
| INTEGER(0..maxNrofPhysicalResourceBlocks -1)     OPTIONAL -- Need S<br>        },<br>        nonInterleaved                            NULL<br>    },<br>    precoderGranularity                       ENUMERATED {sameAsREG-bundle,<br>allContiguousRBs},<br>    tci-StatesPDCCH-ToAddList                 SEQUENCE(SIZE (1..maxNrofTCI-<br>StatesPDCCH)) OF TCI-StateId OPTIONAL, -- Cond NotSIB1-initialBWP<br>    tci-StatesPDCCH-ToReleaseList             SEQUENCE(SIZE (1..maxNrofTCI-<br>StatesPDCCH)) OF TCI-StateId OPTIONAL, -- Cond NotSIB1-initialBWP<br>    tci-PresentInDCI                          ENUMERATED {enabled}<br>OPTIONAL, -- Need S<br>    pdcch-DMRS-ScramblingID                   INTEGER (0..65535)<br>OPTIONAL, -- Need S<br>    ...<br>}<br>-- TAG-CONTROLRESOURCESET-STOP<br>-- ASN1STOP |

With respect to multi-TRP, the parameter higher layer parameter per CORESET (i.e., HigherLayerIndexPerCORESE7) can be introduced within the ControlResourceSetIE in such a manner that a value (e.g., 0, 1, . . . , M) can be indicated, thus allowing CORESETs to be grouped together and assigned to different TRPs. Potential issues with handling CORESETs at an MP-UE connected to multiple TRPs during a multi-TRP transmission operation will now be discussed in greater detail below.

Multi-TRP Related Issues with Handling CORESETs at an MP-UE

In a cell-free massive MIMO scenario, a UE may be simultaneously connected to a relatively large number of TRPs. Further, UEs in NR FR2 (i.e., MP-UEs) have more than one antenna panel, and an MP-UE may select the panel(s) depending on the orientation of the UE and in consideration of other aspects (e.g., power-saving and maximum exposure limit considerations). NR Rel-16 multi-TRP design can be used for this cell-free massive MIMO scenario, where a large number of TRPs involved in the transmission (including, for example, TRPs associated with respectively different gNBs) are, together, visible as a single serving cell and use the same bandwidth part. However, a large number of cooperating TRPs being connected to an MP-UE may result in the MP-UE having to handle a large number CORESETs. In some cases, the number of CORESETs could be substantially larger than the already large number of cooperating TRPs to which the MP-UE is connected. For example, when considering a large number of TRPs that are involved in the cooperation. In Rel-16, RAN 1 extended the number of CORESETs in PDCCH-config to be 5. As explained in the earlier section, the CORESET in PDCCH-config can indicate a different TRP, and in some cases more than one CORESET may be assigned to a TRP to support both unicast and broadcast PDCCH. As the number of cooperating TRPs increases, a total number of CORESETs may also increase. However, complexities (e.g., increased UE processing, increased UE power usage, etc.) associated with the MP-UE handling a large number of CORESETs and searching a large total search space associated with the large number of CORESETs may reduce or limit the total number of cooperating TRPs to which the MP-UE can be connected. Therefore, it would be advantageous to develop a scheme for controlling the total number of CORESETs handled by the MP-UE while implementing the above-referenced cell-free massive MIMO scenario.

Example network architecture and methods for controlling the total number of CORESETs handled by the MP-UE while implementing cell-free massive MIMO are discussed in greater detail below with reference to FIGS. 1-5.

Example Network Architecture and Methods

FIG. 1 illustrates a portion of a communications network 100 according to example embodiments. As is illustrated in FIG. 1, the communications network 100 includes a portion of a 3rd Generation Partnership Project (3GPP) New Radio (NR) access deployment. As is also illustrated in FIG. 1, the communications network 100 include a multi-panel user equipment (MP-UE) 110, which has a first antenna panel 115A, a second antenna panel 115B, a third antenna panel 115C, and a fourth antenna panel 115D.

As is illustrated in FIG. 1, the 3GPP NR radio access deployment of communications network 100 includes first through fifth transmission and reception points (TRPs) 120A-120E. Each TRP 102A, 102B, 102C may be, for example, a remote radio head (RRH) or remote radio unit (RRU) including at least, for example, a radio frequency (RF) antenna (or antennas) or antenna panels, and a radio transceiver, for transmitting and receiving data within a geographical area. In this regard, the TRPs 120A-120E provide cellular resources for user equipment (UEs) within a geographical coverage area. According to example embodiments, each of TRPs 120A-120E is a distribution unit (DU) of a gNB and is connected to a central unit (CU) of a gNB. According to at least some example embodiments, each of TRPs 120A-120E is connected to a different CU, and thus, first through fifth TRPs 120A-120E are the DUs of first through fifth gNBs, respectively. Alternatively, according to at least some example embodiments, some or all of TRPs 120A-120E are connected to the same CU. For example, according to at least some example embodiments, all of TRPs 120A-120E are connected to the same CU, and thus, all of TRPs 120A-120E are DUs of the same gNB. According to example embodiments, in communications network 100, more than one TRP may be connected to the same CU, but no TRP is connected to more than one CU at a time. In some cases, for each of the TRPs 120A-120E, baseband processing may be divided between the TRP and the CU to which the TRP is connected. Alternatively, the baseband processing may be performed at the CU to which the TRP is connected instead of the TRP. Further, TRPs 120A-120E may have independent schedulers. Alternatively, when two or more TRPs from among the TRPs 120A-120E are connected to the same CU, the CU may perform joint scheduling among the two or more TRPs. According to example embodiments, all operations described in the present disclosure as being performed by a TRP may be performed, or controlled, by the CU of the gNB of which the TRP is a DU.

In the example shown in FIG. 1, the TRPs 120A-120E are configured to communicate with a user equipment (UE) (e.g., MP-UE 110) via one or more transmit (TX)/receive (RX) beams, examples of which are illustrated in FIG. 1 as first beams 125A of the first TRP 120A, second beams 125B of the second TRP 120B, third beams 125C of the third TRP 120C, fourth beams 125D of the fourth TRP 120D, and fifth beams 125 E of the fifth TRP 125E. Further, the CU or CUs to which the TRPs 120A-120E are connected communicate with the core network, which is referred to as the New Core in 3GPP NR. An example structure which may be used to embody one or more radio network elements (e.g., gNBs, TRPs, UEs, etc.) of the communications network 100 will now be discussed below with respect to FIG. 2

Figure 2:
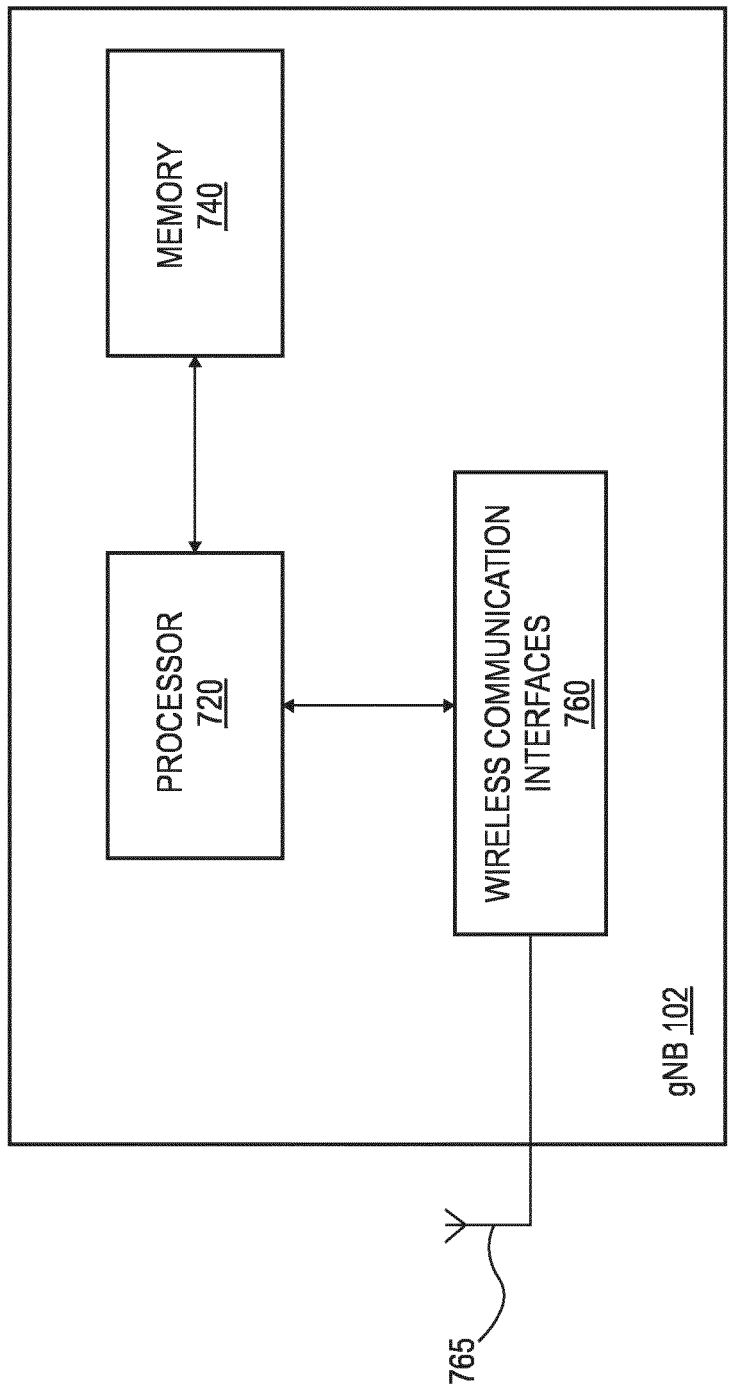
FIG. 2 illustrates an example embodiment of a radio network element, such as a next generation Node B (gNB).

FIG. 2 illustrates an example embodiment of a radio network element. In the example illustrated in FIG. 2, the radio network element is a gNB (i.e., gNB 102).

As shown, the gNB 102 includes: a memory 740; a processor 720 connected to the memory 740; various interfaces 760 connected to the processor 720; and one or more antennas or antenna panels 765 connected to the various interfaces 760. The various interfaces 760 and the antenna 765 may constitute a transceiver for transmitting/receiving data to/from a UE via a plurality of wireless beams or to/from one or more TRPs. According to example embodiments, the memory 740, processor 720, and interfaces 760, collectively, are an example of a CU of the gNB 102, and the one or more antennas or antenna panels 765 are an example of a DU or DUs of the gNB 102. According to example embodiments, the one or more antennas or antennal panels 765 may be embodied by one or more of the first through fifth TRPs 120A-120E illustrated in FIG. 1. Accordingly, the gNB or gNBs of which the first through fifth TRPs 120A-120E are DUs may each have the same structure and function as that described with respect to the gNB 102.

As will be appreciated, depending on the implementation of the gNB 102, the gNB 102 may include many more components than those shown in FIG. 2. However, it is not necessary that all of these generally conventional components be shown in order to disclose the illustrative example embodiment.

The memory 740 may be a computer readable storage medium that generally includes a random access memory (RAM), read only memory (ROM), and/or a permanent mass storage device, such as a disk drive. The memory 740 also stores an operating system and any other routines/modules/applications for providing the functionalities of the gNB (e.g., functionalities of a gNB, methods according to example embodiments, etc.) to be executed by the processor 720. These software components may also be loaded from a separate computer readable storage medium into the memory 740 using a drive mechanism (not shown). Such separate computer readable storage medium may include a disc, tape, DVD/CD-ROM drive, memory card, or other like computer readable storage medium (not shown). In some example embodiments, software components may be loaded into the memory 740 via one of the various interfaces 760, rather than via a computer readable storage medium.

The processor 720 may be configured to carry out instructions of a computer program by performing the arithmetical, logical, and input/output operations of the system. Instructions may be provided to the processor 720 by the memory 740.

The various interfaces 760 may include components that interface the processor 720 with the one or more antennas 765, or other input/output components. As will be understood, the various interfaces 760 and programs stored in the memory 740 to set forth the special purpose functionalities of the gNB 102 will vary depending on the implementation of the gNB 102.

The interfaces 760 may also include one or more user input devices (e.g., a keyboard, a keypad, a mouse, or the like) and user output devices (e.g., a display, a speaker, or the like).

Further, though the radio network element of FIG. 2 is illustrated as a gNB, other network elements (e.g., TRPs, other radio access and backhaul network elements, Central Units (CUs), eNBs, ng-eNBs, UEs, or the like) may also have the structure of the network element illustrated in FIG. 2. In this regard, for example, the memory 740 may store an operating system and any other routines/modules/applications for providing the functionalities of the TRPs, gNBs, UEs, etc. (e.g., functionalities of these elements, methods according to the example embodiments, etc.) to be executed by the processor 720. For example, the MP-UE 110 may be embodied by the network element illustrated in FIG. 2, in which case the first through fourth antenna panels 115A-115D of the MP-UE 110 correspond to the one or more antennas or antenna panels 765 illustrated in FIG. 2, and the memory 740 stores computer-executable instructions that, when executed by the processor 720, cause the processor to perform the operations described in the present disclosure as being performed by the MP-UE 110.

Although only a single UE, MP-UE 110, is shown in FIG. 1, the gNB(s) of which the TRPs 120A-120E are DUs may provide communication services to a relatively large number of UEs within the coverage area of the TRPs 120A-120E. For the sake of clarity of example embodiments, communication services (including transmitting and receiving wireless signals, data, traffic or traffic flows, etc.) are primarily discussed as being between one or more of the TRPs 120A-120E and the MP-UE 110. It should be understood, however, that signals, data, traffic or traffic flows, etc., described in the present disclosure as being transmitted between the TRPs 120A-120E and the MP-UE 110 should also be considered as being transmitted between the gNB(s) of which the TRPs 120A-120E are DUs (e.g., the gNB 102) and the MP-UE 110.

According to example embodiments, communications network 100 may be used to implement cell-free massive multiple input multiple output (MIMO). For example, communications network 100 may support multi-TRP transmission such that more than one of TRPs 120A-120E can provide downlink (DL) signals to the MP-UE simultaneously. Further, the MP-UE 110 may activate a combination of multiple antenna panels from among first through fourth antenna panels 115A-115D so as to receive DL signals through the multiple activated antenna panels, simultaneously. Additionally, as is discussed in greater detail below, at least one or more TRPs (or gNBs) in the communications network 100 are capable of using UE panel activation capability information and UE signal measurements received from the MP-UE 110 to assign CORESETs to some or all of TRPs 120A-120E in a panel combination-specific manner, so as to control a total number of CORESETs handled by the MP-UE 110 during a multi-TRP transmission operation.

Figure 3:
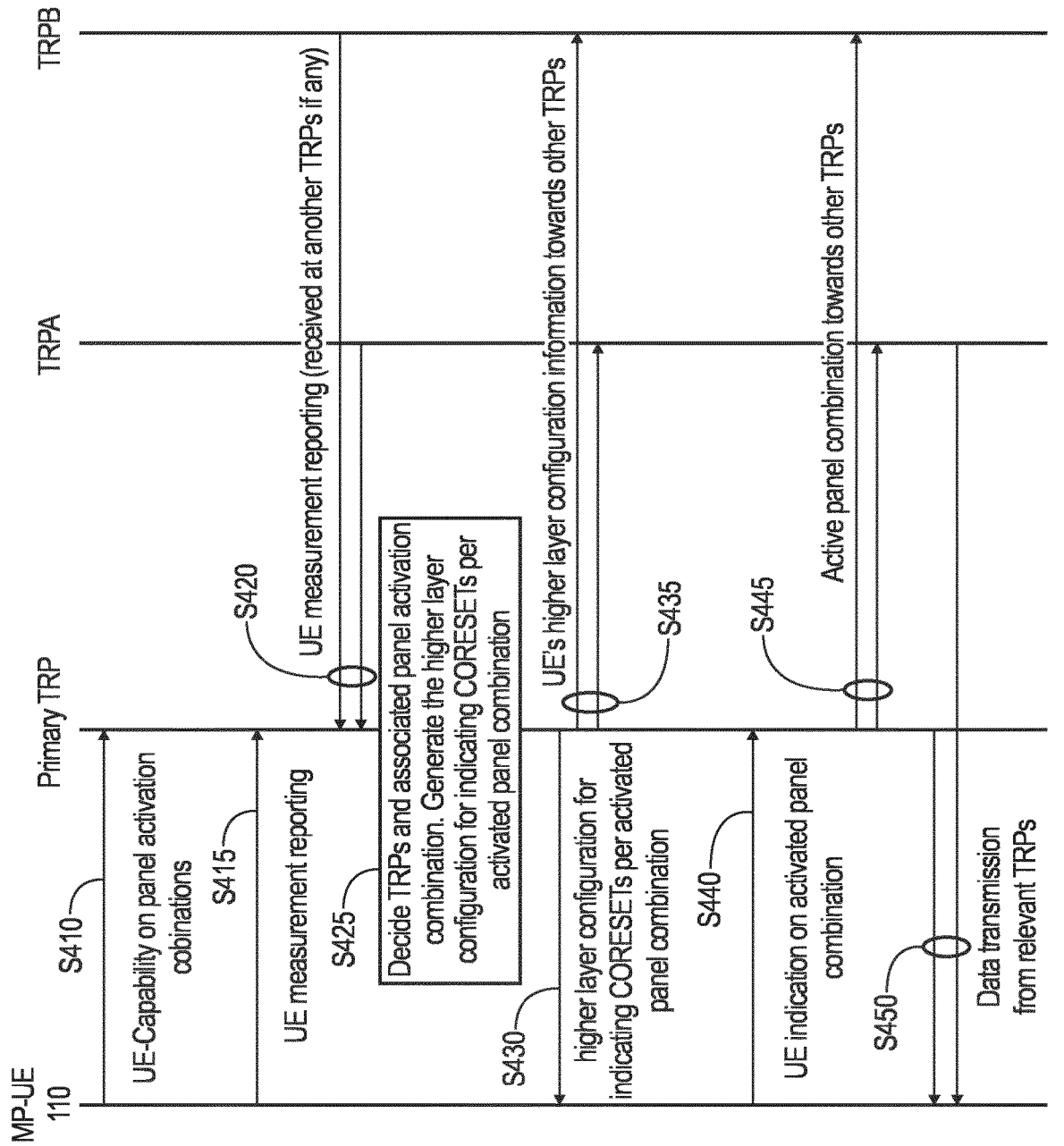
FIG. 3 is a communications timing diagram for explaining a panel combination-specific control resource set (CORESET) assignment according to example embodiments.
Figure 4:
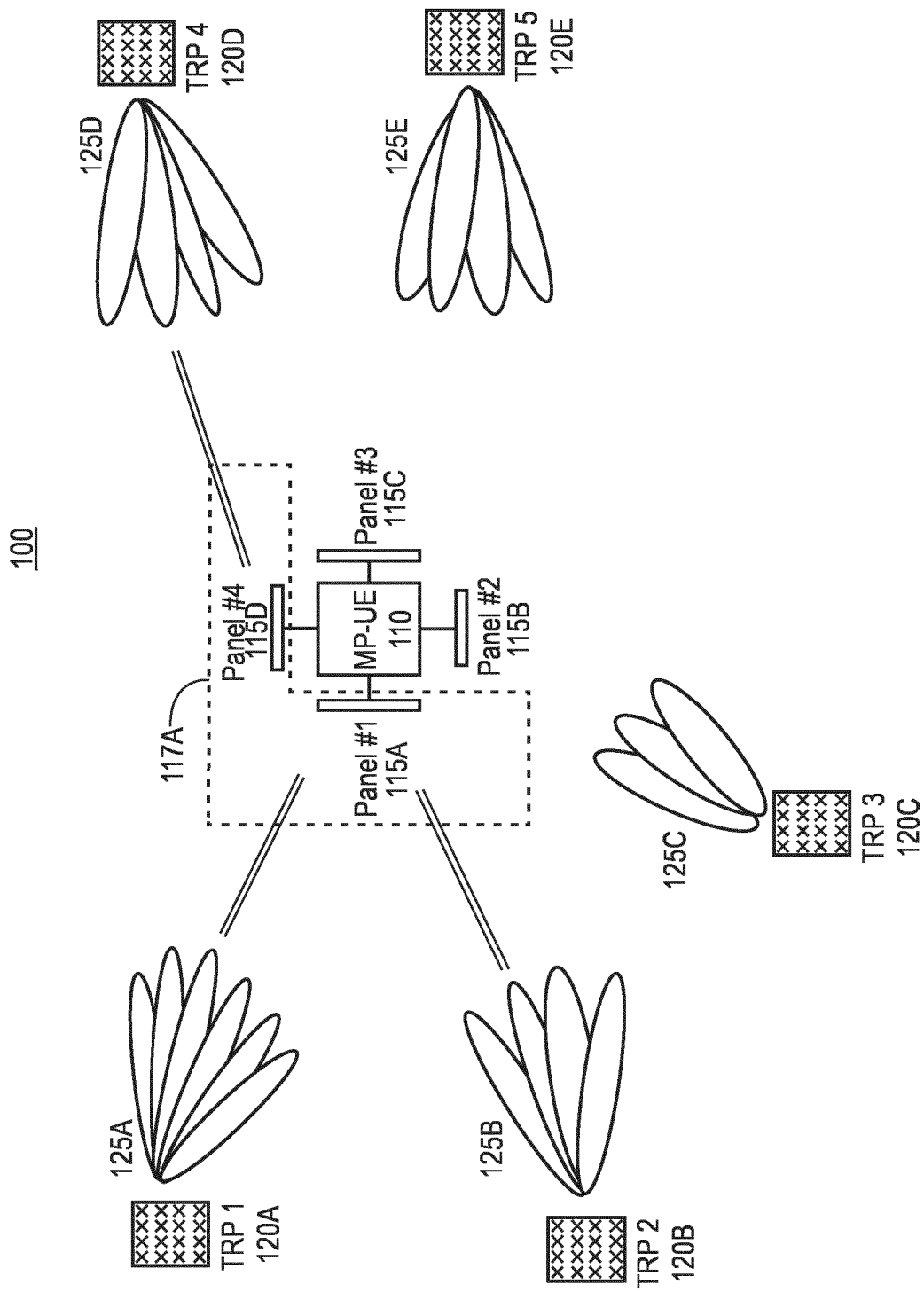
FIG. 4 illustrates an example of a valid panel combination of a multi panel UE (MP-UE) during a multi TRP transmission operation according to example embodiments.
Figure 5:
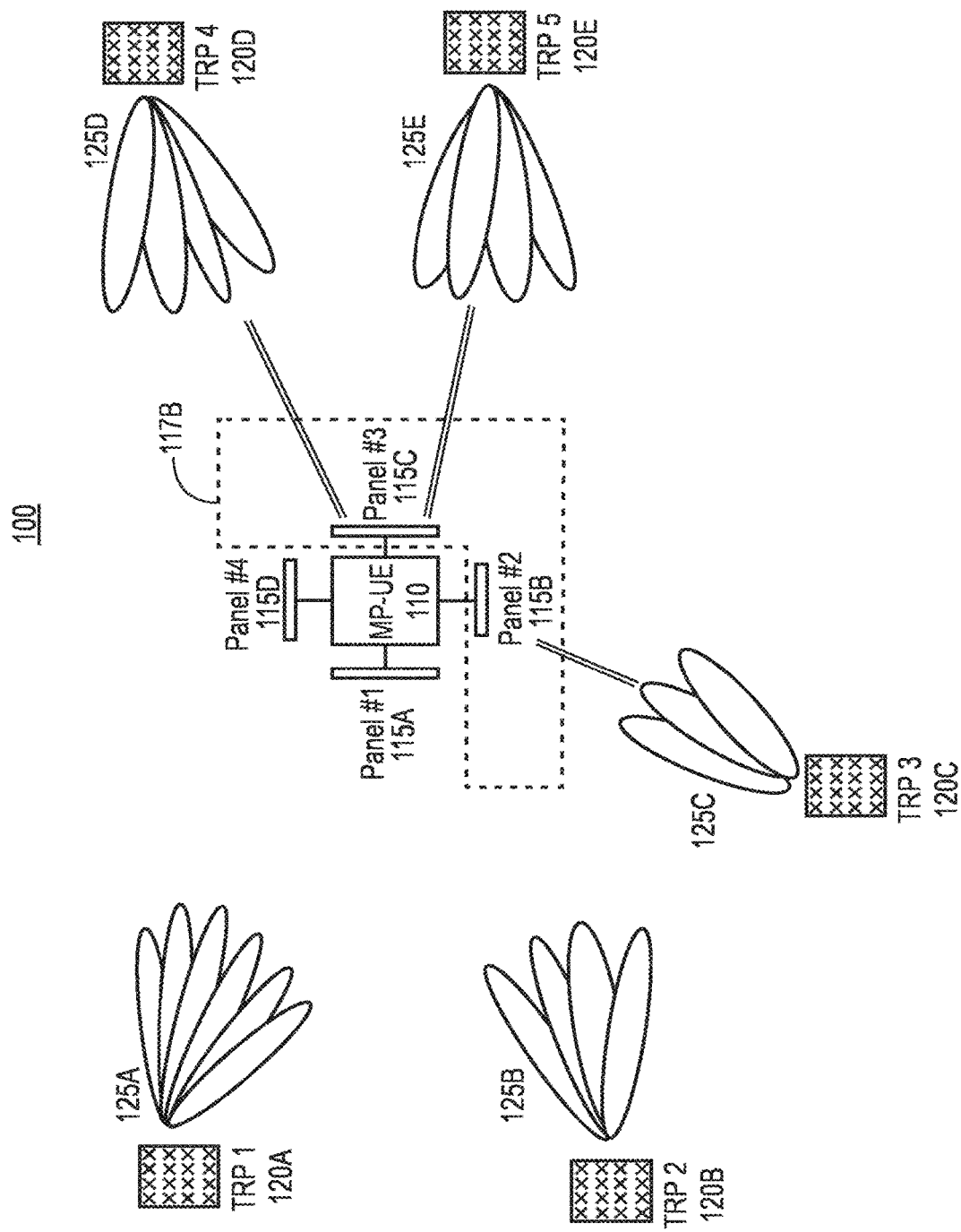
FIG. 5 illustrates another example of a valid panel combination of an MP-UE during a multi TRP transmission operation according to example embodiments.

FIG. 3 is a communications timing diagram for explaining panel combination-specific CORESET assignment according to example embodiments. FIG. 4 illustrates an example of a valid panel combination of a multi-panel UE (MP-UE) during a multi-TRP transmission operation according to example embodiments. FIG. 5 illustrates another example of a valid panel combination of an MP-UE during a multi-TRP transmission operation according to example embodiments. The panel combination-specific CORESET assignment method of FIG. 3 is explained below with reference to the MP-UE 110, a primary TRP and two secondary TRPs, TRPA and TRPB. According to example embodiments, the primary TRP, and secondary TRPs, TRPA and TRB, may be, for example, any three of first through fifth TRPs 120A-120E. Further, for the purpose of simplicity, the panel combination-specific CORESET assignment method of FIG. 3 is explained, primarily, with respect to only 3 TRPs. However, according to example embodiments, the method of FIG. 3 may be performed with respect to any number of TRPs.

Additionally, for the purpose of simplicity, the panel combination-specific CORESET assignment method of FIG. 3 is explained below with respect to a scenario in which the primary TRP and secondary TRPS, TRPA and TRPB, are associated with different gNBs (i.e., connected to different CUs), respectively. However, according to example embodiments, the panel combination-specific CORESET assignment method of FIG. 3 may also be applied to a scenario in which some or all TRPs are associated with the same gNB (i.e., connected to the same CU). For example, in a scenario where two or more TRPs are connected to the same CU (and thus, are DUs of the same gNB), communications described with respect to FIG. 3 as being between the two or more TRPs connected to the same CU may be omitted and replaced, for example, by internal communications and/or processing at the CU to which the two or more TRPs are connected in common.

Referring to FIG. 3, in operation S410, the MP-UE 110 sends UE panel activation capability information to the primary TRP, and the primary TRP receives the UE panel activation capability information. According to example embodiments, the UE panel activation capability information includes information identifying one or more valid panel combinations of the MP-UE 110. A valid panel combination is a set of one or more antenna panels, from among the antenna panels of the MP-UE (i.e., first through fourth antenna panels 115A-115D), that the MP-UE 110 is capable of activating to receive DL communications (e.g., from one or more TRPs). For example, a valid panel combination of the MP-UE 110 that includes only a single antenna panel indicates that the MP-UE 110 is capable of activating that single antenna panel, by itself, to receive DL communications (e.g., from one or more TRPs), and a valid panel combination of the MP-UE 110 that includes multiple antenna panels indicates that the MP-UE 110 is capable of activating the multiple antenna panels, together, to receive DL communications (e.g., from one or more TRPs) simultaneously.

For the purpose of simplicity, FIG. 3 will be explained with respect to a simplified example in which the MP-UE 110 has only two valid panel combinations: first panel combination 117A illustrated in FIG. 4 and second panel combination 117B illustrated in FIG. 5. As shown, the first panel combination 117A includes the first antenna panel 115A and the fourth antenna panel 115D, and the second panel combination 117B includes the second antenna panel 115B and the third antenna panel 115C. Thus, in the example shown in FIGS. 4 and 5, the MP-UE 110 is capable of activating the first antenna panel 115A and the fourth antenna panel 115D of the first panel combination 117A, and receiving DL communications through the first antenna panel 115A and the fourth antenna panel 115D, simultaneously; and the MP-UE 110 is capable of activating the second antenna panel 115B and the third antenna panel 115C of the second panel combination 117B, and receiving DL communications through the second antenna panel 115B and the third antenna panel 115C, simultaneously.

Further, according to example embodiments, the MP-UE 110 is configured such that any configuration of one or more antenna panels that is not designated as one of the valid panel combinations of the MP-UE 110 is not activated by the MP-UE 110 for reception of DL communications. Thus, in the example illustrated in FIGS. 4 and 5, the MP-UE 110 is configured such that the MP-UE 110 does not activate the first antenna panel 115A together with either one of the third antenna panel 115C and the second antenna panel 115B to receive DL communications; the MP-UE 110 does not activate the fourth antenna panel 115D together with either one of the third antenna panel 115C and the second antenna panel 115B to receive DL communications; and the MP-UE 110 does not activate any one of the first through fourth antenna panels 115A-115D, by itself, to receive DL communications (i.e., because, in the simplified example of FIGS. 4 and 5, none of the two valid panel combinations of the MP-UE 110, 117A and 117B, include a configuration of only a single antenna panel).

In operation S415, the MP-UE 110 sends signal strength measurements to the primary TRP, and the primary TRP receives the signal strength measurements. For example, the MP-UE 110 may measure the strengths of signals transmitted to the MP-UE 110 from any or all of the TRPs (e.g., the Primary TRP and secondary TRPs, TRPA and TRPB), and report the signal strength measurements to the primary TRP.

Further, according to example embodiments, the MP-UE 110 may perform the signal strength measurements on a per-panel basis such that, for each individual panel among the first through fourth antenna panels 115A-115D of the MP-UE 110, the MP-UE 110 measures the strengths of signals received at the individual panel from each TRP. For example, using the first antenna panel 115A of the MP-UE 110 as an example, the MP-UE 110 may measure the strength of signals received at the first antenna panel 115A from the Primary TRP, measure the strength of signals received at the first antenna panel 115A from secondary TRP, TRPA, and measure the strength of signals received at the first antenna panel 115A from secondary TRP, TRPB. Further, for the second through fourth antenna panels 115B-115D, the MP-UE 110 may make the same signal strength measurements discussed above with respect to the first antenna panel 115A.

Further, according to example embodiments, for each valid panel combination, the MP-UE 110 can perform signal strength measurements with respect to the valid panel combination and report possible TRPs from which the MP-UE 110 can receive DL transmissions via the valid panel combination. Additionally, when determining the aforementioned possible TRPs from which the MP-UE 110 can receive DL transmissions via a valid panel combination, the MP-UE 110 may also consider beam pairs (with respect to one or more TRPs) that the MP-UE 110 can use to receive multiple DL transmissions, simultaneously, via the valid panel combination (e.g., multi-TRP transmission).

Thus, according to example embodiments, the MP-UE 110 may generate signal strength information that includes per-panel (and/or per-panel combination) signal strength measurements made by the MP-UE 110 with respect to each of the TRPs (i.e. the primary TRP and secondary TRPs, TRPA and TRPB), and, in operation S415, the MP-UE 110 may send the generated signal strength information (i.e., the signal strength measurements) to the primary TRP.

In operation S420, TRPA and/or TRPB send signal strength measurements of the MP-UE 110 to the primary TRP. For example, according to example embodiments, in operation S420, the signal strength measurements that are sent to the primary TRP are signal strength measurements that have been reported to the TRPA and/or TRPB by the MP-UE 110, if any such signal strength measurements exist. For example, if TRPA has received any signal strength measurements that were reported to TRPA by the MP-UE 110 then, in operation S420, TRPA sends the reported signal strength measurements to the primary TRP. Similarly, if TRPB has received any signal strength measurements that were reported to TRPB by the MP-UE 110 then, in operation S420, TRPB sends the reported signal strength measurements to the primary TRP. According to example embodiments, in the same manner discussed above with respect to the signal strength measurements of operation S415, the signal strength measurements sent from TRPA and/or TRPB to the primary TRP in operation S420 may be signal strengths measurements that were made by the MP-UE 110 on a per-panel (and/or per-panel combination) basis.

According to example embodiments, the MP-UE 110 may make the signal strength measurements discussed above with respect to operations S415 and S420 in accordance with known methods for measuring strengths of signals (e.g., downlink (DL) signals) received at the antenna(s), or antenna panel(s), of a UE. According to example embodiments, the signal strength measurements discussed above with respect to operations S415 and S420 include any or all of synchronization signal block (SSB), tracking reference signal (TRS), and Channel State Information Reference Signal (CSI-RS) measurements, and the like.

In operation S425, the primary TRP uses the UE panel activation capability information received in operation S410 and the signal strength measurements received in operations S415 and/or S420 to generate per-panel-combination CORESET configurations by assigning CORESETs to TRPs on a per-panel combination basis. For example, based on the per-panel (and/or per-panel combination) signal measurements received at the primary TRP in operations S415 and/or S420, the primary TRP determines, for each valid panel combination included in the UE panel activation capability information received in operation S410, a set of TRPs to use to perform DL transmission with respect to the valid panel combination when the valid panel combination is activated.

For example, using the example illustrated in FIGS. 4 and 5, the primary TRP will generate a CORESET configuration for each valid panel combination of the MP-UE 110 (i.e., the first panel combination 117A and the second panel combination 117B). FIG. 6 illustrates example CORESET configurations according to example embodiments. As is discussed in greater detail below, the first CORESET configuration 610 and second CORESET configuration 620 may be generated by the primary TRP for the first panel combination 117A and the second panel combination 117B, respectively. As illustrated in FIG. 6, each of the first and second CORESET configurations identifies one or more CORESETs corresponding to each TRP in a TRP set (i.e., first TRP set 615 and second TRP set 625).

According to example embodiments, in order to determine which TRPs to include in the TRP sets corresponding to each valid panel combination, the primary TRP can select the TRPs corresponding to the best received signal strengths with respect to the panel(s) of each panel combination. According to example embodiments, the primary TRP can further consider beam management aspects where selected TRPs can schedule beams simultaneously towards different panels (within an activated combination). The primary TRP can further consider TRP resource utilization when supporting other UEs. The primary TRP can further consider backhaul latency between TRPs when coordinating multi-TRP transmissions. Based on at least the aforementioned considerations and signal strength measurements, the primary determines a TRP set for each valid panel combination.

An example manner in which the primary TRP generates the first CORESET configuration 610 for the first panel combination 117A is discussed below.

For example, with respect to the first panel combination 117A (which includes the first antenna panel 115A and the fourth antenna panel 115D), the primary TRP may use signal strength measurements reported by the MP-UE 110 with respect to the first antenna panel 115A and signal strength measurements reported by the MP-UE 110 with respect to the fourth antenna panel 115D to determine the TRP set that corresponds to the first panel combination 117A (i.e., the TRPs that will be allowed to provide DL transmissions to the MP-UE 110 when the MP-UE activates the first panel combination 117A).

FIG. 4 illustrates an example in which the primary TRP (e.g., first TRP 120A) determines that the TRP set corresponding to the first panel combination 117A is {first TRP 120A, second TRP 120B, the fourth TRP 120D} (i.e., first TRP set 615 of FIG. 6), as is indicated by the lines illustrated as extending from the first TRP 120A, second TRP 120B, and fourth TRP 120D towards the first panel combination 117A. Next, the primary TRP assigns one or more CORESETs from among a reference or, alternatively, maximum number of CORESETs to each TRP in the TRP set corresponding to the first panel combination 117A. The maximum number of CORESETs can be set to any value in accordance with the preferences of a designer or operator of the communications network 100. In the example illustrated in FIG. 6, the maximum number of total CORESETs=5. Accordingly, the primary TRP generates the CORESET configuration corresponding to the first panel combination 117A (i.e., the first CORESET configuration 610) by distributing no more than five CORESETs (e.g., CORESETs #1, #2, #3, #4 and #5) among the first TRP set 615. In the example illustrated in FIG. 6, the primary TRP chooses to assign CORESETs #1 and #2 to the first TRP 120A, assign CORESET #4 to the second TRP 120B, and assign CORESETs #3 and #5 to the fourth TRP 120D. According to example embodiments, after generating the first CORESET configuration 610, the primary TRP stores the generated first CORESET configuration 610 for later use.

An example manner in which the primary TRP generates the second CORESET configuration 620 for the second panel combination 117B is discussed below.

For example, with respect to the second panel combination 117B (which includes the second antenna panel 115B and the third antenna panel 115C), the primary TRP may use signal strength measurements reported by the MP-UE 110 with respect to the second antenna panel 115B and signal strength measurements reported by the MP-UE 110 with respect to the third antenna panel 115C to determine the TRP set that corresponds to the second panel combination 117B (i.e., the TRPs that will be allowed to provide DL transmissions to the MP-UE 110 when the MP-UE 110 activates the second panel combination 117B).

FIG. 5 illustrates an example in which the primary TRP (e.g., first TRP 120A) determines that the TRP set corresponding to the second panel combination 117B is {third TRP 120C, fourth TRP 120D, fifth TRP 120E} (i.e., second TRP set 625 of FIG. 6), as is indicated by the lines illustrated as extending from the third TRP 120C, fourth TRP 120D, and fifth TRP 120E towards the second panel combination 117B. Next, the primary TRP assigns one or more CORESETs from among the reference or, alternatively, maximum number of CORESETs to each TRP in the TRP set corresponding to the first panel combination 117A. As is noted above, in the example illustrated in FIG. 6, the maximum number of total CORESETs=5. Accordingly, the primary TRP generates the CORESET configuration corresponding to the second panel combination 117B (i.e., the second CORESET configuration 620) by distributing no more than five CORESETs (e.g., CORESETs #1, #2, #3, #4 and #5) among the second TRP set 625. In the example illustrated in FIG. 6, the primary TRP chooses to assign CORESET #4 to the third TRP 120C, assign CORESETs #1 and #3 to the fourth TRP 120D, and assign CORESETs #2 and #5 to the fifth TRP 120E. According to example embodiments, after generating the second CORESET configuration 620, the primary TRP stores the generated first CORESET configuration 620 for later use.

Returning to FIG. 3, in operation S430, the primary TRP sends a higher layer configuration which indicates the CORESETs configurations corresponding to each valid panel combination of the MP-UE 110 to the MP-UE 110, and the MP-UE 110 receives and stores the higher layer configuration. For example, with respect to the example illustrated in FIGS. 4-6, the higher layer configuration sent in operation S430 would include the first CORESET configuration 610 of the first panel combination 170A and the second CORESET configuration 620 of the second panel combination 170B generated in operation S425.

In operation S435, the primary TRP sends the higher layer configuration (e.g., first CORESET configuration 610 of the first panel combination 170A and the second CORESET configuration 620 of the second panel combination 170B) to the secondary TRPs, TRPA and TRPB, which each receive and store the higher layer configuration for later use.

In operation S440, the MP-UE 110 sends an indication of an activated panel combination to the primary TRP, and the primary TRP receives the indication. The indication of activated panel combination identifies the panel combination that the MP-UE 110 has activated to receive DL transmissions.

In operation S445, the primary TRP sends the indication of activated panel combination to the secondary TRPs, TRPA and TRPB.

In operation S450, one or more TRPs provide DL transmissions to the MP-UE 110 in accordance with the CORESET configuration corresponding to the valid panel combination identified by the indication of activated panel combination sent by the MP-UE 110 to the primary TRP in operation S440 and sent by the primary TRP to the secondary TRPs, TRPA and TRPB in operation S445.

For example, if the indication of activated panel combination received by a TRP (e.g., any of the primary TRP, TRPA and TRPB) in operation S440 or S445 identifies the first panel combination 117A as the activated panel combination of the MP-UE 110, the TRP will retrieve the CORESET configuration corresponding to the first panel combination 117A (i.e., the first CORESET configuration 610) from the among the previously stored CORESET configurations, and the TRP will determine whether or not it is included in the first TRP set 615. In response to the TRP determining that it is included in the first TRP set 615, the TRP finds the CORESETs assigned to it in the first CORESET configuration 610, and the TRP uses the assigned CORESETs to provide DL transmissions to the MP-UE 110. Further, if the TRP determines that it is not included in the first TRP set 615, then, according to example embodiments, the TRP does not provide DL transmissions to the MP-UE 110 while the first activated panel combination 117A remains activated.

For example, if the activated panel combination is the first panel combination 117A, then, in operation S450, the TRPs included in the first TRP set 615 (i.e., the first TRP 120A, the second TRP 120B and the fourth TRP 120D) will all provide DL transmissions to the MP-UE 110 using the CORESETs identified in the first CORESET configuration 610. Further, according to example embodiments, TRPs not included in the first TRP set 615 (i.e., the third TRP 120C and the fifth TRP 120E) will not provide DL transmissions to the MP-UE 110 while the activated panel combination is the first panel combination 117A.

As another example, if the activated panel combination is the second panel combination 117B, then, in operation S450, the TRPs included in the second TRP set 625 (i.e., the third TRP 120C, the fourth TRP 120D and the fifth TRP 120E) will all provide DL transmissions to the MP-UE 110 using the CORESETs identified in the second CORESET configuration 620. Further, according to example embodiments, TRPs not included in the second TRP set 625 (i.e., the first TRP 120A and the second TRP 120B) will not provide DL transmissions to the MP-UE 110 while the activated panel combination is the second panel combination 117B.

Further, because the primary TRP generates the CORESET configurations (i.e., in operation S425) in such a manner that no CORESET configuration includes more than the reference or, alternatively, maximum number of total CORESETs, complexities associated with handling a high number of CORESETs and a large combined CORESET search space (e.g., higher UE power usage, higher UE processing resource usage, etc.) may be reduced or, alternatively, eliminated.

Example signaling for use in transmitting the CORESET configurations discussed above with reference to FIGS. 3 and 6 will now be discussed below.

First Example Signaling

According to example embodiments, the information include in the CORESET configuration illustrated in FIG. 6 can be transmitted by using a modified version of the Rel-15 PDCCH-Config 1E (e.g., 3GPP TS 38.331 v15.7.0), as shown below:

Example modified PDDCH-Config IE

```
-- ASN1START
-- TAG-PDCCH-CONFIG-START
PDCCH-Config ::=                    SEQUENCE {
    controlResourceSetToAddModList         SEQUENCE(SIZE (1..3)) OF
ControlResourceSet                          OPTIONAL,    -- Need N
    controlResourceSetToReleaseList        SEQUENCE(SIZE (1..3)) OF
```

| Example modified PDDCH-Config IE |
| --- |
| ControlResourceSetId                               OPTIONAL,      -- Need N<br>    controlResourceSetToAddModList- PanelComb    SEQUENCE(SIZE (1..MaxPanelCombinations)) OF<br>controlResourceSetToAddModList MPUE     OPTIONAL,     -- Need N<br>    controlResourceSetToAddModList- PanelComb    SEQUENCE(SIZE (1..MAxPanelCombinations ) ) OF<br>controlResourceSetToReleaseList MPUE     OPTIONAL,     -- Need N<br>    controlResourceSetToAddModList MPUE    SEQUENCE(SIZE (1..3)) OF<br>ControlResourceSet                              OPTIONAL,      -- Need N<br>    controlResourceSetToReleaseList MPUE    SEQUENCE(SIZE (1..3)) OF<br>ControlResourceSetId                            OPTIONAL,      -- Need N<br>    searchSpacesToAddModList            SEQUENCE(SIZE (1..10)) OF<br>SearchSpace                                  OPTIONAL,      -- Need N<br>    searchSpacesToReleaseList           SEQUENCE(SIZE (1..10)) OF<br>SearchSpaceId                                OPTIONAL,      -- Need N<br>    downlinkPreemption                   SetupRelease{ DownlinkPreemption }      OPTIONAL,     -- Need M<br>    tpc-PUSCH                                   SetupRelease{ PUSCH-TPC-CommandConfig }         OPTIONAL,     -- Need M<br>    tpc-PUCCH                                   SetupRelease{ PUCCH-TPC-CommandConfig }         OPTIONAL,     -- Need M<br>    tpc-SRS                                       SetupRelease{ SRS-TPC-CommandConfig}          OPTIONAL,     -- Need M<br>    ...<br>}<br>-- TAG-PDCCH-CONFIG-STOP<br>-- ASN1STOP |

For example, the above-referenced example modified PDCCH-Config 1E includes a panel-specific list "controlResourceSetToAddModList-PanelComb" (and "controlResourceSetToReleaseModList-PanelComb"). Further, the panel-specific list "controlResourceSetToAddModList-PanelComb" includes a sequence of up to "MaxPanelCombination" (i.e., a maximum number of panel combinations) of "controlResourceSetToAddModList_MPUE" lists. Additionally, each "controlResourceSetToAddModList_MPUE" list includes up to 3 CORESETs. However, though the "controlResourceSetToAddModList_MPUE" lists are explained with reference to an example in which each list includes up to 3 CORESETs, example embodiments are not limited to this example. According to example embodiments, the maximum number of CORESETs for the "controlResourceSetToAddModList_MPUE" lists may be set to any number, for example, in accordance with the preferences of a designer and/or operator of the communications network 100. For example, according to at least some example embodiments, each "controlResourceSetToAddModList_MPUE" list includes up to 5 CORESETs.

Additionally, each CORESET may include a higher layer index per CORESET value "HigherLayerindexperCORESET" in order to differentiate between different TRPs, as is shown below with reference to a modified Rel-15 ControlResourceSet IE (e.g., 3GPP TS 38.331 v15.7.0):

| Example modified ControlResourceSet IE |
| --- |
| -- ASN1START<br>-- TAG-CONTROLRESOURCESET-START<br>ControlResourceSet ::=              SEQUENCE {<br>    controlResourceSetId                ControlResourceSetId,<br>    HigherLayerIndexperCORESET      INTEGER(1,...,MaxTRPs)<br>    frequencyDomainResources        BIT STRING (SIZE (45)),<br>    duration                            INTEGER (1..maxCoReSetDuration),<br>    cce-REG-MappingType             CHOICE {<br>        interleaved                     SEQUENCE {<br>            reg-BundleSize                  ENUMERATED {n2, n3, n6},<br>            interleaverSize                ENUMERATED {n2, n3, n6},<br>            shiftIndex                       INTEGER(0..maxNrofPhysicalResourceBlocks-1)    OPTIONAL -- Need S<br>        },<br>        nonInterleaved                NULL<br>    },<br>    precoderGranularity              ENUMERATED {sameAsREG-bundle, allContiguousRBs},<br>    tci-StatesPDCCH-ToAddList       SEQUENCE(SIZE (1..maxNrofTCI-StatesPDCCH)) OF TCI-StateId OPTIONAL, -- Cond NotSIB1-initialBWP<br>    tci-StatesPDCCH-ToReleaseList   SEQUENCE(SIZE (1..maxNrofTCI-StatesPDCCH)) OF TCI-StateId OPTIONAL, -- Cond NotSIB1-initialBWP<br>    tci-PresentInDCI                   ENUMERATED {enabled}                OPTIONAL, -- Need S<br>    pdcch-DMRS-ScramblingID         INTEGER |

| Example modified ControlResourceSet IE | | |
|---|---|---|
| (0..65535) ... } -- TAG-CONTROLRESOURCESET-STOP -- ASN1STOP | OPTIONAL, | Need S |

Second Example Signaling

As another example, multiple PDCCH-Configs may be used in a bandwidth part (BWP) configuration.

For example, the Rel-15 BWP-DownlinkDedicated IE (e.g., 3GPP TS 38.331 v15.7.0) may be modified as follows:

```
-- ASN1START
-- TAG-EWP-DOWNLINKDEDICATED-START
BWP-DownlinkDedicated :: =          SEQUENCE {
    Pdcch-Config-PanelComb              SEQUENCE (SIZE
(1..MaxPanelCombinations) )                         OPTIONAL,      -- Need M
    pdcch-Config                    SetupRelease { PDCCH-Config
}                                   OPTIONAL,      -- Need M
    pdsch-Config                    SetupRelease { PDSCH-Config
}                                   OPTIONAL,      -- Need M
    sps-Config                      SetupRelease { SPS-Config
}                                   OPTIONAL,      -- Need M
    radioLinkMonitoringConfig       SetupRelease {
RadioLinkMonitoringConfig }                         OPTIONAL, --
Need M
    ...
}
-- TAG-EWP-DOWNLINKDEDICATED-STOP
-- ASN1STOP
```

For present second signaling example, the PDCCH-Config 1E need not be modified in the manner described above with respect to the first signaling example because there are multiple PDCCH-Configs within the BWP configuration, and each PDCCH-Config can have separate CORESET configs. Further, the ControlResourceSet IE may be modified to include the higher layer index per CORESET value "HigherLayerindexperCORESET" in the same manner shown above with respect to the first signaling example.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

As discussed herein, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example, existing UE, base stations, eNBs, RRHs, gNBs, femto base stations, network controllers, computers, Central Units (CUs), ng-eNBs, other radio access or backhaul network elements, or the like. Such existing hardware may be processing or control circuitry such as, but not limited to, one or more processors, one or more Central Processing Units (CPUs), one or more controllers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUs), one or more microprocessors, one or more Application Specific Integrated Circuits (ASICs), or any other device or devices capable of responding to and executing instructions in a defined manner.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium," "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine-readable mediums for storing information. The term "computer readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks. For example, as mentioned above, according to one or more example embodiments, at least one memory may include or store computer program code, and the at least one memory and the computer program code may be configured to, with at least one processor, cause a network element or network device to perform the necessary tasks. Additionally, the processor, memory and example algorithms, encoded as computer program code, serve as means for providing or causing performance of operations discussed herein.

A code segment of computer program code may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable technique including memory sharing, message passing, token passing, network transmission, etc.

The terms "including" and/or "having," as used herein, are defined as comprising (i.e., open language). The term "coupled," as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

According to example embodiments, UE, base stations, eNBs, RRHs, gNBs, femto base stations, network controllers, computers, Central Units (CUs), ng-eNBs, other radio access or backhaul network elements, or the like, may be (or include) hardware, firmware, hardware executing software or any combination thereof. Such hardware may include processing or control circuitry such as, but not limited to, one or more processors, one or more CPUs, one or more controllers, one or more ALUs, one or more DSPs, one or more microcomputers, one or more FPGAs, one or more SoCs, one or more PLUs, one or more microprocessors, one or more ASICs, or any other device or devices capable of responding to and executing instructions in a defined manner.

Benefits, other advantages, and solutions to problems have been described above with regard to specific embodiments of the invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

What is claimed is:

1. A method of operating a radio network element, the method comprising:
   receiving user equipment (UE) capability information indicating a plurality of panel combinations of a multi panel UE (MP-UE), each panel combination including at least one antenna panel from among a plurality of antenna panels of the MP-UE;
   receiving, from the MP-UE, signal strength information corresponding to a plurality of transmission reception points (TRPs);
   based on the signal strength information, determining a plurality of TRP sets that correspond to the plurality of panel combinations, respectively; and
   generating a plurality of control resource set (CORESET) configurations that correspond to the plurality of panel combinations, respectively,
   wherein, for each panel combination, the TRP set corresponding to the panel combination indicates at least one TRP from among the plurality of TRPs, and the CORESET configuration corresponding to the panel combination defines one or more CORESETs to be used by the at least one TRP to provide downlink (DL) transmissions to the MP-UE via the panel combination.

2. The method of claim 1, wherein each panel combination from among the plurality of panel combinations that includes at least two antenna panels is a panel combination that the MP-UE is capable of activating in such a manner that the MP-UE receives DL transmissions through the activated panels included in the panel combination, simultaneously.

3. The method of claim 1, wherein the radio network element is a first TRP, and the first TRP is included in the plurality of TRPs.

4. The method of claim 3, further comprising:
sending, by the first TRP, higher layer configuration information of the MP-UE from the first TRP to one or more second TRPs from among the plurality of TRPs, the higher layer configuration information identifying the panel combinations of the MP-UE and the CORESET configurations corresponding to the panel combinations.

5. The method of claim 4 further comprising:
receiving, by the first TRP, a first indication from the MP-UE, the first indication identifying an activated panel combination from among the plurality of panel combinations of the MP-UE;
in response to receiving the first indication, determining, by the first TRP, whether the first TRP is included in the TRP set from among the plurality of TRP sets that corresponds to the activated panel combination; and
in response to determining the first TRP is included in the TRP set that corresponds to the activated panel combination, using the CORESET configuration from among the plurality of CORESET configurations that corresponds to the activated panel combination to provide DL transmissions from the first TRP to the MP-UE.

6. The method of claim 1, wherein the signal strength information includes signal strength information corresponding to the plurality of TRPs, with respect to each of one or more panel combinations from among the plurality of panel combinations.

7. A radio network element comprising:
a processor; and
memory storing computer-executable instructions that, when executed by the processor, cause the radio network element at least to:
receive user equipment (UE) capability information indicating a plurality of panel combinations of a multi panel UE (MP-UE), each panel combination including at least one antenna panel from among a plurality of antenna panels of the MP-UE,
receive, from the MP-UE, signal strength information corresponding to plurality of transmission reception points (TRPs),
based on the signal strength information, determine a plurality of TRP sets that correspond to the plurality of panel combinations, respectively, and
generate a plurality of control resource set (CORESET) configurations that correspond to the plurality of panel combinations, respectively,
wherein, for each panel combination, the TRP set corresponding to the panel combination indicates at least one TRP from among the plurality of TRPs, and the CORESET configuration corresponding to the panel combination defines one or more CORESETs to be used by the at least one TRP to provide downlink (DL) transmissions to the MP-UE via the panel combination.

8. The radio network element of claim 7 wherein, each panel combination from among the plurality of panel combinations that includes at least two antenna panels is a panel combination that the MP-UE is capable of activating in such a manner that the MP-UE receives DL transmissions through the activated panels included in the panel combination, simultaneously.

9. The radio network element of claim 7, wherein the radio network element is a first TRP, and the first TRP is included in the plurality of TRPs.

10. The radio network element of claim 9, wherein the computer-executable instructions, when executed by the processor, further cause the radio network element to:
send, by the first TRP, higher layer configuration information of the MP-UE from the first TRP to one or more second TRPs from among the plurality of TRPs, the higher layer configuration information identifying the panel combinations of the MP-UE and the CORESET configurations corresponding to the panel combinations.

11. The radio network element of claim 10, wherein the computer-executable instructions, when executed by the processor, further cause the radio network element to:
receive, by the first TRP, a first indication from the MP-UE, the first indication identifying an activated panel combination from among the plurality of panel combinations of the MP-UE;
in response to receiving the first indication, determine, by the first TRP, whether the first TRP is included in the TRP set from among the plurality of TRP sets that corresponds to the activated panel combination; and
in response to determining the first TRP is included in the TRP set that corresponds to the activated panel combination, use the CORESET configuration from among the plurality of CORESET configurations that corresponds to the activated panel combination to provide DL transmissions from the first TRP to the MP-UE.

12. The radio network element of claim 7, wherein the signal strength information includes signal strength information corresponding to the plurality of TRPs, with respect to each of one or more panel combinations from among the plurality of panel combinations.

13. A system comprising:
a radio network element;
a processor; and
a memory storing computer-executable instructions that, when executed by the processor, cause the radio network element at least to:
receive user equipment (UE) capability information indicating a plurality of panel combinations of a multi panel UE (MP-UE), each panel combination including at least one antenna panel from among a plurality of antenna panels of the MP-UE,
receive, from the MP-UE, signal strength information corresponding to plurality of transmission reception points (TRPs),
based on the signal strength information, determine a plurality of TRP sets that correspond to the plurality of panel combinations, respectively, and
generate a plurality of control resource set (CORESET) configurations that correspond to the plurality of panel combinations, respectively,
wherein, for each panel combination, the TRP set corresponding to the panel combination indicates at least one TRP from among the plurality of TRPs, and the CORESET configuration corresponding to the panel combination defines one or more CORESETs to be used by the at least one TRP to provide downlink (DL) transmissions to the MP-UE via the panel combination.

14. The system of claim 13, wherein each panel combination from among the plurality of panel combinations that includes at least two antenna panels is a panel combination that the MP-UE is capable of activating in such a manner that the MP-UE receives DL transmissions through the activated panels included in the panel combination, simultaneously.

15. The system of claim 13, wherein the radio network element is a first TRP, and the first TRP is included in the plurality of TRPs.

16. The system of claim 15, wherein the computer-executable instructions, when executed by the processor, further cause the radio network element to:
send, by the first TRP, higher layer configuration information of the MP-UE from the first TRP to one or more second TRPs from among the plurality of TRPs, the higher layer configuration information identifying the panel combinations of the MP-UE and the CORESET configurations corresponding to the panel combinations.

17. The system of claim 16, wherein the computer-executable instructions, when executed by the processor, further cause the radio network element to:
receive, by the first TRP, a first indication from the MP-UE, the first indication identifying an activated panel combination from among the plurality of panel combinations of the MP-UE;
in response to receiving the first indication, determine, by the first TRP, whether the first TRP is included in the TRP set from among the plurality of TRP sets that corresponds to the activated panel combination; and
in response to determining the first TRP is included in the TRP set that corresponds to the activated panel combination, use the CORESET configuration from among the plurality of CORESET configurations that corresponds to the activated panel combination to provide DL transmissions from the first TRP to the MP-UE.

18. The system of claim 13, wherein the signal strength information includes signal strength information corresponding to the plurality of TRPs, with respect to each of one or more panel combinations from among the plurality of panel combinations.

* * * * *